June 23, 1925.
W. E. WINE
SIDE BEARING
Filed Dec. 3, 1923
1,543,538
2 Sheets-Sheet 1
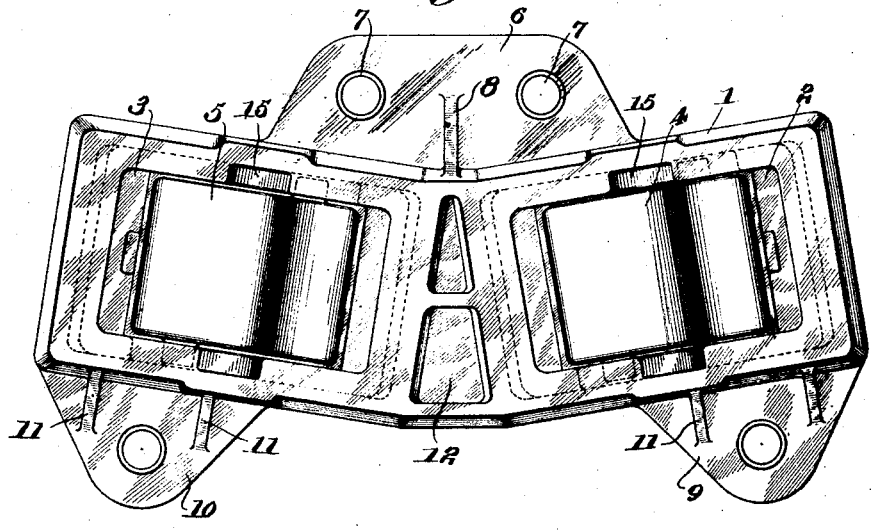
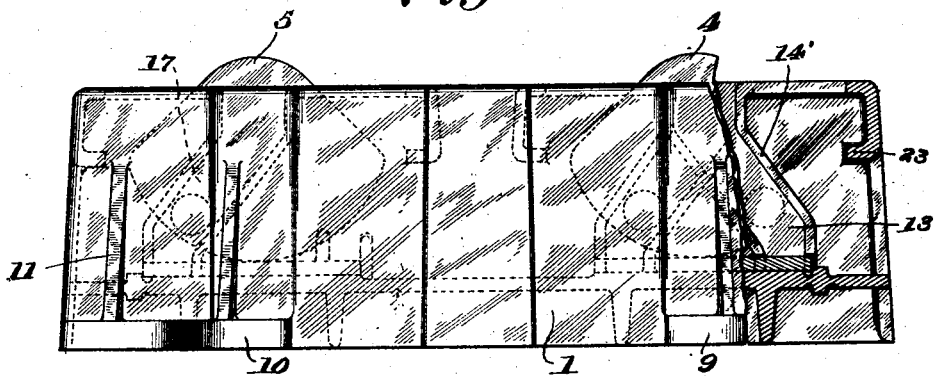
Inventor
William E. Wine.
By Parker Cook.
Attorney June 23, 1925.
W. E. WINE
SIDE BEARING
Filed Dec. 3, 1923

Inventor
William E. Wine.
By Parker Cook
Attorney

Patented June 23, 1925.

1,543,538

UNITED STATES PATENT OFFICE.

WILLIAM E. WINE, OF TOLEDO, OHIO.

SIDE BEARING.

Application filed December 3, 1923. Serial No. 678,247.

*To all whom it may concern:*

Be it known that I, WILLIAM E. WINE, a citizen of the United States of America, residing at Toledo, in the county of Lucas and State of Ohio, have invented certain new and useful Improvements in Side Bearings, of which the following is a specification.

My invention relates to new and useful improvements in side bearings and more particularly to the type which is known as the self-centering side bearing. It has been found desirable in roller side bearings to have a wear plate of hardened steel for the roller to travel on, so that the bottom of the housing will not become worn, misshaped or roughened due to the extreme weight which is transferred from the load and the roller to the bottom of the housing.

Furthermore, it is sometimes desirable to insert a new roller and a new wear plate, so means have to be provided for retaining the wear plate in position, which will securely lock the wear plate so that the same will not shift or become disengaged from the housing.

One of the principal objects of the present invention, therefore, is to provide a side-bearing wherein the roller may be easily placed in position and may be easily removed, and furthermore, to so construct a side-bearing that a wear plate may be inserted in the housing and be tightly held in place, and if found necessary to insert a new plate, it may be accomplished with but little difficulty.

Still another object of the invention is to provide a side-bearing wherein tracks or guideways are provided for the guiding of lugs or pinions which are disposed on the opposite sides of the rollers and which guideways are so designed and arranged at their lower end to form part of the retaining means for the hardened steel plate.

Still other objects of the invention are to provide a self-centering side-bearing which is extremely efficient in service, relatively cheap to manufacture, easily assembled and easily repaired.

With these and other objects in view, the invention consists in certain new and novel arrangements and combination of parts as will be hereinafter more fully described and pointed out in the claims.

Referring now to the drawings, an embodiment of the invention is shown wherein the housing is designed to receive two roller bearings and two plates.

Fig. 1 is a top plan view with the rollers in their center position;

Fig. 2 is a face view, a part of the housing being broken away for the sake of clearness;

Figure 3:
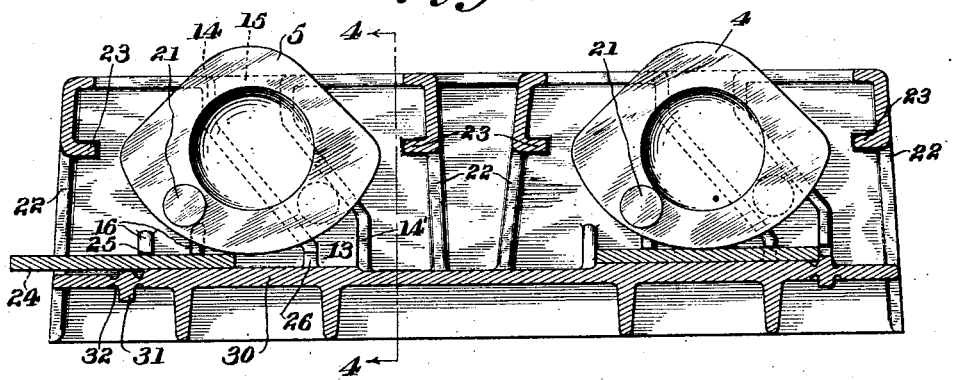
Fig. 3 is a sectional view taken longitudinally of the bearing.

Referring more specifically to the drawings, there is shown a housing 1, having the two compartments 2 and 3 for the reception of rollers 4 and 5. An ear 6 is shown provided with the apertures 7 through which may be passed the ordinary fastening bolts (not shown). This ear is formed integral with the housing and may be braced as at 8. Two further ears 9 and 10 are shown on the opposite sides of the housing for the reception of bolts, which ears 9 and 10 may be braced as at 11.

As shown in this embodiment of the invention, the housing is substantially divided into two parts both of which are similar throughout, and it will be readily seen that if a side bearing with but one roller is desired, it will simply mean a division of the housing and a different disposition of the several ears. When the housing accommodates two rollers, the central portion of the housing will be formed as at 12, a small brace being shown as extending between the two compartments.

Inasmuch as the arrangement of the side walls, guideways, rollers and plates, to be mentioned, are identical, a description of one set will be a description of the other.

Figure 5:
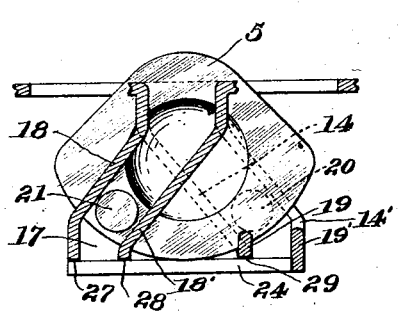
Fig. 5 is a fragmentary sectional view of a centered roller; diagrammatic in form.
Figure 6:
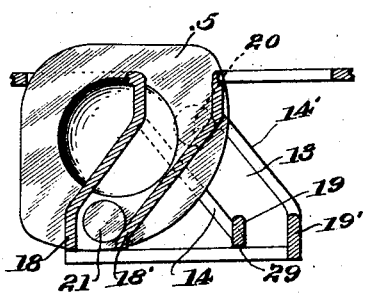
Fig. 6 is a similar view but with the roller revolved to one side.
Figure 4:
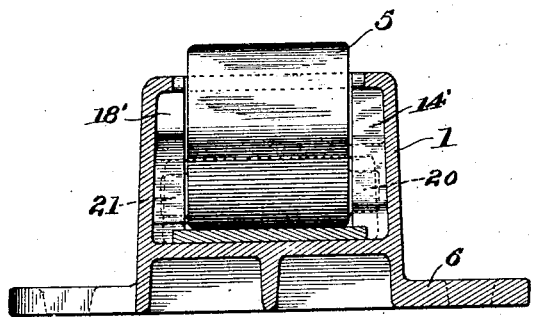
Fig. 4 is a sectional view taken on line 4—4 of Fig. 3.
Figure 7:
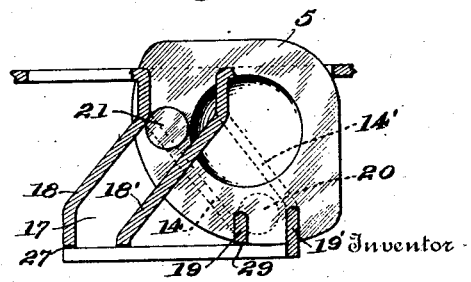
Fig. 7 is a similar view, but with the roller revolved to the opposite side.

Referring now to the left-hand portion of Fig. 3, and to Figs. 5, 6 and 7 inclusive, the housing is shown with a guideway 13 on the far wall of the housing with respect to Fig. 3, which guideway is formed by providing the integral ribs 14 and 14' which extend angularly for their greater distance, and vertically at their upper and lower ends, the mouth of the guideway being shown as at 15. Also formed on the rear wall, as may be seen in Fig. 3, are the two retaining lugs 16 which are located diametrically opposite a guidway 17 which is likewise formed by the ribs 18 and 18′ formed on the near wall; this guideway being angularly disposed with relation to the one on the far wall. Also on the near wall and diametrically opposite the guideway 13 on the far wall are two further lugs 19 and 19′. The purpose of the lugs 16, and 19 and 19′ will be discussed as the specification proceeds.

The roller 5 is provided on its opposite face with trunnions 20 and 21, one being located to one side of a vertical plane passing through the vertical axis of the roller and the other being located on the opposite side of said plane. The circumference of the lower portion of the roller 5, the width of the guideways 13 and 17, the diameters of the trunnions 20 and 21 and the angular position of the guideways are all arranged to permit the roller to revolve or partly revolve as shown in Figs. 5 to 7 inclusive. It might be mentioned that the roller is of the well-known Wine type, so that a flat surface will be presented to the body bolster plate when the side bearing is revolved in either direction.

By positioning these guideways as seen in the several views, the roller may be held in a certain position in the hand and easily dropped within the housing, and in a like manner they may be turned to a certain position and easily removed therefrom. On the other hand, however, it cannot be removed when in its centered position which is a desirable feature as often the side bearing is attached to the body bolster rather than the truck bolster and therefore in an inverted position, and inasmuch as the load is present on the roller, when it is in a revolved position, it will be imposible for the same to drop from the housing.

Referring further to Fig. 3, and to the left-hand portion thereof, it will be seen that the opposite end walls are formed with the apertures 22, the upper edges of each of the apertures having the flange or rib 23 extending therealong, which rib is cast integrally with the housing to brace the end walls.

As before mentioned, it has been found desirable to provide a hardened steel plate for the roller to rest upon and also to provide means for locking this plate in place.

In Fig. 3 there is shown this hardenen steel plate 24, which is designed to be passed through the aperture 22 and through the slots 25 formed in the lugs 16 and through a slot 26 in the rib 14 and abut against the lower portion of the rib 14′. In a like manner, the near side of the plate, in the near side wall of the housing, will pass through the slots 27 and 28 formed respectively in the ribs 18 and 18′ and the slot 29 formed in the lug 19 and abut against the lug 19′. The slots are of such a width that the plate may be forced into position, while for securely holding the plate in place after it has once been inserted, I have formed in the bottom 30 of the housing, the teat 31 which may be struck by a hammer, or in other words, bumped, after the plate is in position so that it will then project above the bottom surface of the plate as shown in Fig. 3 at the right-hand side of the figure. To make it possible to so bump this teat, I have formed a small annular ring 32 around the teat on the lower and on the upper surfaces of the bottom 30 of the housing, allowing the metal to move slightly when the teat is truck.

From the foregoing, it will be seen that I have provided a side bearing having certain guideways formed therein, so that the roller or rollers may be quickly inserted, but cannot become accidentally removed, and wherein the ribs forming the guideways together with lugs form a retaining means for the insertion of hardened steel plates on which the rollers travel. Also, a locking means is provided in the form of a teat, so that after the plate is inserted, it will be firmly locked against longitudinal travel or displacement. The bearing is one which has proved very efficient in service, is relatively cheap to manufacture, and easily repaired if the necessity arises.

The bearing may be designed to accommodate two rollers when it is to be used on the hundred-ton cars or larger, or it may be designed to accommodate one roller when used on the smaller type freight cars.

Many slight changes might be made without in any way departing from the spirit and scope of my invention.

Having thus described the same, what I claim as new and desire to secure by Letters Patent is:—

1. A self-centering side bearing comprising a housing, a guideway formed on one side wall and extending from a corner to the upper center of the housing, a second guideway formed on the opposite side wall and extending from the far corner to the upper center of the housing so that a portion only of the guideways are opposite each other, a self-centering roller within said housing having trunnions moving within said guideways, a separable plate within said housing and said guideways forming means for holding the plate from movement in all but one direction, and means formed in the bottom wall of said housing to hold the plate from movement in this direction.

2. A self-centering side bearing comprising a housing, said housing divided into two compartments extending at an angle to each other, a self-centering roller in each of said compartments, guideways formed in the opposite side walls of said compartments, the said guideways of each compartment extending in the opposite direction to each other, each of said compartments also provided with two sets of lugs respectively located opposite the said guideways, each of said rollers provided with two trunnions to operate within their respective guideways, the end walls of each compartment having an opening therein, and wear plates passed within said openings, the said wear-plates extending within the pathways of said guideways and the said guideways and lugs retaining the plates against movement except in one direction and additional means for providing against movement in the one excepted direction.

3. A self-centering side bearing comprising a housing, ribs on one side of said housing forming a passageway, lugs formed on the said side wall, the lower end of said ribs being slotted as well as the first of said lugs, a second passageway formed on the opposite side wall and extending in the opposite direction to said first named passageway, two lugs on said side wall and opposite the first mentioned passageway, the first two lugs and the first rib formed on the second mentioned side wall being slotted, the end wall having an aperture, a wear plate passed within said slots and abutting against a rib and a lug, a teat formed near the entrance in the end wall and adapted to be struck to thereby retain the said wear plate against an outward movement.

4. A housing for a self-centering side-bearing, having two compartments therein and in angular relation to each other, each compartment provided with guideways arranged in staggered relation and having their mouths opposite, lugs arranged directly opposite, the lower ends of said guideways having a slot in their forward portion, a wear-plate held at all four corners by said guideways and lugs, and means formed in the bottom wall of said housing for preventing an upward movement of said wear-plate.

5. A housing for a self-centering side-bearing comprising a receiving chamber for a roller, guideways extending from the opposite corners of said chambers at the sides of said chamber to the central portion of said chamber, and lugs formed on the said side walls directly opposite the respective guideways, a wear-plate within the chamber and abutting against one lug of each series and under a lug of each series and the lower wall of each of said guideways being cut out so that the wear plate may pass under one wall and abut against the other of said walls of each of said guideways, and additional means for locking the plate against outward movement.

In testimony whereof I affix my signature.

WILLIAM E. WINE.